(12) United States Patent
Fröberg Olsson et al.

(10) Patent No.: US 9,054,834 B2
(45) Date of Patent: Jun. 9, 2015

(54) SELECTION OF TRANSPORT FORMAT IN WIRELESS COMMUNICATION SYSTEMS

(75) Inventors: Jonas Fröberg Olsson, Ljungsbro (SE); Arne Simonsson, Gammelstad (SE); Magnus Thurfjell, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 155 days.

(21) Appl. No.: 13/574,203

(22) PCT Filed: Jan. 28, 2010

(86) PCT No.: PCT/SE2010/050087
§ 371 (c)(1), (2), (4) Date: Aug. 6, 2012

(87) PCT Pub. No.: WO2011/093756
PCT Pub. Date: Aug. 4, 2011

(65) Prior Publication Data
US 2012/0300739 A1 Nov. 29, 2012

(51) Int. Cl.
*H04W 72/08* (2009.01)
*H04L 1/00* (2006.01)
*H04L 1/20* (2006.01)

(52) U.S. Cl.
CPC ............ *H04L 1/0006* (2013.01); *H04L 1/0021* (2013.01); *H04L 1/0025* (2013.01); *H04L 1/0026* (2013.01); *H04L 1/203* (2013.01)

(58) Field of Classification Search
USPC .......... 370/252, 267, 329, 335–338; 375/219, 375/224, 262
See application file for complete search history.

(56) References Cited

U.S. PATENT DOCUMENTS

| | | |
|---|---|---|
| 2006/0129567 A1 | 6/2006 | Uchida |
| 2006/0268976 A1 | 11/2006 | Baum et al. |
| 2007/0253388 A1 | 11/2007 | Pietraski |

(Continued)

OTHER PUBLICATIONS

Assaad, M. "Reduction of the Feedback Delay Impact on the Performance of Scheduling of OFDMA Systems." IEEE 70th Vehicular Technology Conference, Sep. 20-23, 2009, pp. 1-4.
Takeda, D. et al. "Threshold Controlling Scheme for Adaptive Modulation and Coding System." 15th IEEE International Symposium on Personal, Indoor and Mobile Radio Communications, Sep. 5-8, 2004, pp. 1351-1355.

(Continued)

*Primary Examiner* — Andrew Chriss
*Assistant Examiner* — Peter Mak
(74) *Attorney, Agent, or Firm* — Murphy, Bilak & Homiller, PLLC

(57) ABSTRACT

Disclosed herein is a first network node and a method in a first network node for selecting a transport format among a plurality of available transport formats for communicating information with a second network node via a wireless link, which transport formats are such that a first transport format has a first maximum capacity and all the other transport formats have a higher maximum capacity in an increasing order. The method comprises the steps of: obtaining a quality indicator, which quality indicator indicates the current channel quality of the wireless link; determining a throughput indicator, which throughput indicator indicates the throughput format being available at the obtained quality indicator; calculating a switching value based on the quality indicator and the throughput indicator; switching to the second transport format when the quality indicator indicates that the switching value is reached or exceeded with respect to the second transport format; sending a notification to the second node, which notification indicates the switch to the second transport format.

12 Claims, 8 Drawing Sheets

| CQI Index | Modulation | Code Rate x 1024 | Efficiency | Bits/Symbol | Error Rate Target |
|---|---|---|---|---|---|
| 0 | Out of Range | | | Out of Range | |
| 1 | QPSK | 78 | 0.1523 | 2 | |
| 2 | QPSK | 120 | 0.2344 | 2 | 35% |
| 3 | QPSK | 193 | 0.3770 | 2 | 38% |
| 4 | QPSK | 308 | 0.6016 | 2 | 37% |
| 5 | QPSK | 449 | 0.8770 | 2 | 31% |
| 6 | QPSK | 602 | 1.1758 | 2 | 25% |
| 7 | 16QAM | 378 | 1.4766 | 4 | 20% |
| 8 | 16QAM | 490 | 1.9141 | 4 | 23% |
| 9 | 16QAM | 616 | 2.4063 | 4 | 20% |
| 10 | 64QAM | 466 | 2.7305 | 6 | 12% |
| 11 | 64QAM | 567 | 3.3223 | 6 | 18% |
| 12 | 64QAM | 666 | 3.9023 | 6 | 15% |
| 13 | 64QAM | 772 | 4.5234 | 6 | 14% |
| 14 | 64QAM | 873 | 5.1152 | 6 | 12% |
| 15 | 64QAM | 948 | 5.5547 | 6 | 8% |

1A  1B

(56) References Cited

U.S. PATENT DOCUMENTS

| | | | |
|---|---|---|---|
| 2007/0275665 A1 | 11/2007 | Molnar et al. | |
| 2008/0130711 A1 | 6/2008 | Catreux-Erceg et al. | |
| 2009/0245337 A1* | 10/2009 | Ramachandran et al. | 375/224 |
| 2010/0232303 A1* | 9/2010 | Harada et al. | 370/252 |
| 2013/0272270 A1* | 10/2013 | Pietraski | 370/335 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 8)", 3GPP TS 36.213 V8.6.0, Mar. 2009, 1-77.

* cited by examiner

SELECTION OF TRANSPORT FORMAT IN WIRELESS COMMUNICATION SYSTEMS

TECHNICAL FIELD

The invention relates to the selection of a transport format for sending information from a sending node to a receiving node via a wireless link.

BACKGROUND

Wireless links are widely used in modern communication and a multitude of wireless communication systems have been developed to provide such wireless communication. Well known wireless communication systems are e.g. the Global System for Mobile communications (GSM), the General Packet Radio Service (GPRS), the Universal Mobile Telecommunications System (UMTS) and other cellular technologies or similar. Other well known examples of wireless communication systems are the Wireless Local Access Networks (WLAN) of various types and the Worldwide Interoperability for Microwave Access (WiMAX).

The selection of a relevant transport format to be used for communicating via a wireless link is crucial to obtain an advantageous performance, e.g. such as a high throughput. Thus, most modern wireless communication systems are configured to dynamically select an advantageous transport format among a set of available transport formats for sending information to a receiver via a wireless link.

Generally, a transport format is the manner in which the information is conveyed over a wireless link. This may e.g. include the used modulation and/or coding and/or power level and/or frequency or number of transmission layers (MIMO rank) etc for constituting the wireless link.

The 3$^{rd}$ Generation Partnership Project (3GPP, see e.g. www.3gpp.org) has specified that a transport format should be chosen based on so-called Channel Quality Indicator reports (CQI-reports) in connection with the so-called Long Term Evolution (LTE), see e.g. the specification 3GPP TS 36.213 v8.6.0 "E-UTRA Physical Layer Procedures". The CQI-reports are typically derived by the receiver to reflect channel quality and interference levels of the wireless link in question. The CQI-reports are then communicated back to the transmitter over a signaling channel of the wireless link. For example, the CQI-reports may be derived by a mobile terminal such as a User Equipment (UE) or similar and then sent back to a base station such as a Node B or similar. In downlink the received CQI-reports are then used by the transmitter to select the transport format that enables a transmission of as much user data as possible using as little resources as possible. However, for uplink there are typically no CQI-reports but the transport format selection is done in the base station directly on uplink measures such as Signal-to-Noise-Ratio (SNR) and the selected uplink transport format is then sent to the mobile terminal.

According to the specification 3GPP TS 36.213, V8.6.0 a UE or similar shall, based on an unrestricted observation interval in time and frequency, derive for each CQI value reported in uplink subframe n the highest CQI-index between 0 and 15 as defined in a table 7.2.3-1 of said specification. The table 7.2.3-1 is substantially identical to table 1A in FIG. 1 of the appended drawings, which defines 16 different CQI-indexes 0-15 corresponding to 16 different transport formats TF0-TF15. However, the derivation of a CQI-index must satisfy the condition that; a single Physical Downlink Shared Channel (PDSCH) transport block with a combination of modulation scheme and transport block size corresponding to the CQI-index, and occupying a group of downlink physical resource blocks termed the CQI reference resource, could be received with a transport block error probability (BLER) not exceeding 0.1. If this condition is not satisfied by CQI-index 1, then CQI index 0 shall be derived. The resulting BLER will then be less than 0.1 in an ideal case. However, the reported CQI will be delayed and degraded by other measurement errors. To mitigate that an outer-loop CQI-adjustment may e.g. be designed measuring BLER and adjusting with a margin so as for example to target an average Hybrid Automatic Repeat Request (HARQ) retransmission of 10%.

FIG. 2a illustrates schematic graphs of the throughput of the transport formats TF1-TF15 in table 1A as a function of Signal-to-Noise-Ratio (SNR). The graphs TF1-TF15 can e.g. be obtained by link simulations or similar. In addition, FIG. 2b is a schematic illustration of the throughput of one representative transport format TFi being valid mutatis mutandis for all transport formats TF1-TF15. As can be seen in FIG. 2b, the schematic throughput of the transport format TFi has a substantially skewed S-shape. The throughput is maximised above a certain SNR-high value and it is minimized (substantially zero) below a certain SNR-low value. The throughput increases at an increasing rate as the SNR rises above the SNR-low value until the SNR-value reaches a SNR-linear-low value, thus forming a lower knee. Above the SNR-linear-low value the throughput increases at a substantially linear rate until the SNR-value reaches the SNR-linear-high value, thus forming a substantially straight line. Above the SNR-linear-high value the throughput increases at a decreasing rate until the SNR-value reaches a SNR-high value, thus forming an upper knee.

It should be emphasised that the graphs in FIG. 2a are merely examples of throughput curves. The various available transport formats may be represented by several possible throughput curves to optimize against. For example, it is possible to only consider throughput curves without HARQ retransmissions. But it is also possible to take HARQ retransmission effects into account, where e.g. chase combining or incremental redundancy gains are taken into consideration.

In view of the specification 3GPP TS 36.213, V8.6.0 and table 1A in FIG. 1 comprising the transport formats 1-15 as schematically illustrated in FIG. 2a-2b it can be concluded that a UE or similar will select the transport format with the highest throughput at the current SNR-value, corresponding to a CQI value for the wireless channel in question, provided that the BLER for the transport block does not exceed 10%. Hence, at an excellent SNR-value transport format TF15 (CQI-index 15) will be used, which according to table 1A has a 64 QAM modulation with a code rate of 948×1024 bits/s (6 bits/symbol). If the SNR-value deteriorates such that the BLER exceeds 10% the next transport format TF14 (CQI-index 14) will be selected, which according to table 1A has a 64 QAM modulation with a code rate of 873×1024 bits/s (6 bits/symbol). If the SNR-value deteriorates further such that such that the BLER exceeds 10% again then the next transport format TF13 (CQI-index 13) will be selected, and so on until the first transport format TF1 (CQI-index 1) is selected, which according to table 1A has a QPSK modulation with a code rate of 78×1024 bits/s (2 bits/symbol). Lower SNR-values are out of range with respect to the transport format selection provided for according to the specification 3GPP TS 36.213, V8.6.0.

The transport formats 1-15 (modulation and coding combinations) according to FIG. 1 is only used for CQI reporting. The actual transport formats used at transmission can be a larger set than the reported 15 enabling a refined granularity. The selection of used transport formats is an eNodeB vendor specific choice. The eNodeB does not necessary (and typically not) follow the recommended transport formats indicated by CQI.

However, using a HARQ BLER target or BLER target as described above is not optimal for the whole range of radio link quality and reported CQI. According to this approach, a current transport format TFi+1 will be replaced with a new transport format TFi with a lower throughput when the BLER reaches 10% even if the current transport format would have provided a higher throughput at higher BLER values (i.e. BLER≥10%).

Hence, in view of the above there seems to be a need for improvements directed to the selection of a transport format to be used by a wireless link in a wireless communication system.

SUMMARY OF THE INVENTION

In general, using a single HARQ BLER target or BLER target or similar is not optimal for the whole range of radio link quality and reported CQI. This is schematically illustrated in FIG. 2c showing a current transport format TFi+1 providing a higher throughput of Thpi+1 and a new transport format TFi providing a lower throughput Thpi.

In FIG. 2c it is assumed that a BLER of 10% occurs when the SNR reaches a threshold of TH1, at which the transport format is switched from TFi+1 to TFi lowering the throughput from Thpi+1 to Thpi. However, it would have been more advantageous to delay the change of transport format until the BLER reaches a value that occurs at a SNR threshold TH2 at the intersection of the throughput graphs of TFi+1 and TFi.

Actually, to maximize the overall throughput it would be advantageous to follow, as closely as possible; the envelope of the throughputs curves of the available transport formats. For example, the envelope of the throughputs of the transport formats TF1-TF15 illustrated by the curves in FIG. 2a.

Hence, the present invention provides at least one improvement with respect to the discussion above, which improvement is accomplished according to a first embodiment of the invention directed to a method in a first network node for selecting a transport format among a plurality of available transport formats for communicating information with a second network node via a wireless link. Here, the transport formats are such that a first transport format has a first maximum capacity and all the other transport formats have a higher maximum capacity in an increasing order. The method comprises the steps of obtaining a quality indicator, which quality indicator indicates the current channel quality of the wireless link; determining a throughput indicator, which throughput indicator indicates the throughput of at least a first transport format and a second transport format being available at the obtained quality indicator; calculating a switching value at least based on the quality indicator and the throughput indicator; switching to the second transport format when the quality indicator indicates that the switching value is reached or exceeded with respect to the second transport format; and sending a notification to the second node, which notification indicates the switch to the second transport format.

This enables the transport formats to be switched depending on the used transport format and a variable switching value that is dynamically calculated at least based on the currently obtained quality indicator. In turn, this makes it possible to maximize the overall throughput by following, as closely as possible; the envelope of the throughput curves of the available transport formats.

Here, it should be added that the available transport formats has a maximum capacity in an increasing order e.g. as described below for the transport formats TF1-TF15 in FIG. 2a and at the beginning of the section "Operation of certain embodiments" giving the exemplifying relationship of:

$Thp_1 < Thp_2 < Thp_3 < Thp_4 < Thp_5 < Thp_6 < Thp_7 < Thp_8 < Thp_9 << Thp_{10} < Thp_{11} < Thp_{12} < Thp_{13} < Thp_{14} < Thp_{15}$

The maximum capacity is preferably the maximum throughput possible for the transport format in question, i.e. the maximum throughput under ideal conditions, or at least under a sufficiently high SNR or similar.

The quality indicator may e.g. be represented by a SNR, Signal-to-Interference-Ratio (SIR), CQI, BLER or HARQ BLER or similar.

The throughput indicator may e.g. be represented by an array, or a matrix or a table or similar that may indicate the throughput of several available transport formats. The throughput indicator may e.g. at least indicate and/or comprise the throughput of the available transport formats, or the throughput of each available transport format and its association with a quantified index, e.g. such as a quantified CQI index as illustrated in table 1A of FIG. 1. The throughput for a certain transport format is preferably the current capacity (or the current maximum capacity) at a certain obtained quality indicator (e.g. at a certain CQI or SNR or similar). The throughput may vary depending on the quality indicator. The throughput may e.g. be measured, calculated and/or estimated. The throughput may e.g. be given in the form of bits per second (bit/s) or symbols per second or similar.

The switching value may e.g. be a threshold and/or a target. In some embodiments a threshold is the same as a target, or equivalent to a target. The switching value may e.g. be represented by an error rate or similar (e.g. BLER or HARQ BLER or similar) possibly being measured and/or estimated and/or calculated or similar, or be represented by the throughput or similar of the available transport formats possibly being measured and/or estimated and/or calculated or similar at a certain obtained quality indicator.

In a first further embodiment, comprising the features of the first embodiment, the switching value is represented by an error rate calculated based on the throughput of the first transport format and the throughput of the second transport format being the next in order at said quality indicator.

The steps of the first embodiment combined with the first further embodiment would then preferably be the following: obtain a quality indicator; determine a throughput indicator at least indicating the throughput (e.g. the maximum possible throughput) for the first and the second transport formats (e.g. TFi+1 and TFi in eq (1) described below, see also FIG. 2a); calculate a switching value (e.g. BLERthld,i in eq (1), where BLERthld,i depends on Thp1 and Thpi+1, which in turn is determined by where on the x-axis we are in FIG. 2a, which in turn is determined by the obtained quality indicator); switch to the second transport format when the quality indicator (e.g. BLER or similar) indicates that the switching value (e.g. BLERthld,i) is reached or exceeded. Calculating a switching value based on the throughput for the first and the second transport format provides a very simple and effective manner of calculating a suitable switching value.

In a second further embodiment, comprising the features of the first embodiment, the throughput indicator is represented by an estimated throughput at said quality indicator for each available transport format adjusted by at least one of: an estimated distribution of the channel quality indicated by the quality indicator; and an estimated distribution of the quality indicator indicating the current channel quality. In turn, the switching value is calculated by obtaining the maximum throughput of the available transport formats at said quality indicator, and the switch to the second transport format is done when the quality indicator indicates that the second transport format has reached the switching value.

The steps of the first embodiment combined with the second further embodiment would then preferably be the following: obtain a quality indicator; determine a throughput indicator at least indicating the throughput for the first and the second transport formats (e.g. using eq (7) described below to determine the expected throughput at the obtained quality indicator (CQI) for the first and the second transport formats and possibly for all available transport formats being available, i.e. being of interest, at the obtained quality indicator); calculate a switching value (e.g. the TF(CQI) in eq (8) described below, by selecting the transport format that has the highest expected maximum throughput at the obtained quality indicator); switch to the second transport format when the quality indicator indicates that the switching value (e.g. TF(CQI)) is reached or exceeded. Assuming that the first transport format, so far, has had the highest expected maximum throughput we would like to switch from the first transport format to the second transport format when the second transport format has an even higher expected maximum throughput at the obtained quality indicator. This occurs when the throughput of the second transport format reaches the switching value, i.e. we will switch when the throughput of the second transport format becomes the highest expected maximum throughput at the obtained quality indicator, e.g. as calculated by eq (8).

In addition, the present invention provides at least one improvement with respect to the discussion above, which improvement is accomplished according to a second embodiment of the invention directed to a first network node configured to operatively select a transport format among a plurality of available transport formats for communicating with a second network node via a wireless link. The transport formats are such that a first transport format has a first maximum capacity and all the other transport formats have a higher maximum capacity in an increasing order. The first node is further configured to operatively: obtain a quality indicator, which quality indicator indicates the current channel quality of the wireless link; determine a throughput indicator, which throughput indicator indicates the throughput of at least a first transport format and a second transport format being available at the obtained quality indicator; calculate a switching value at least based on the quality indicator and the throughput indicator; switch to the second transport format when the quality indicator indicates that the switching value is reached or exceeded with respect to the second transport format; send a notification to the second node, which notification indicates the switch to the second transport format.

This enables the transport formats to be switched by the first node depending on the used transport format and a variable switching value that is dynamically calculated based on the currently obtained quality indicator. In turn, this makes it possible to maximize the overall throughput by following, as closely as possible; the envelope of the throughput curves of the available transport formats.

It should be noted that the first and second further embodiments discussed above applies mutatis mutandis to the second embodiment.

Further advantages of the present invention and embodiments thereof will appear from the following detailed description of the invention.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasised that the steps of the exemplifying methods described in this specification must not necessarily be executed in the order in which they appear. Moreover, embodiments of the exemplifying methods described in this specification may comprise fewer steps or additional steps without departing from the scope of the present invention.

BRIEF DESCRIPTION OF THE DRAWINGS

FIG. 2b is a schematic illustration of the throughput of a representative transport format TFi being valid mutatis mutandis for all transport formats TF1-TF15 in FIG. 2a.

DETAILED DESCRIPTION OF EMBODIMENTS

Structure of Embodiments

A First Exemplifying Communication System

Figure 3A:
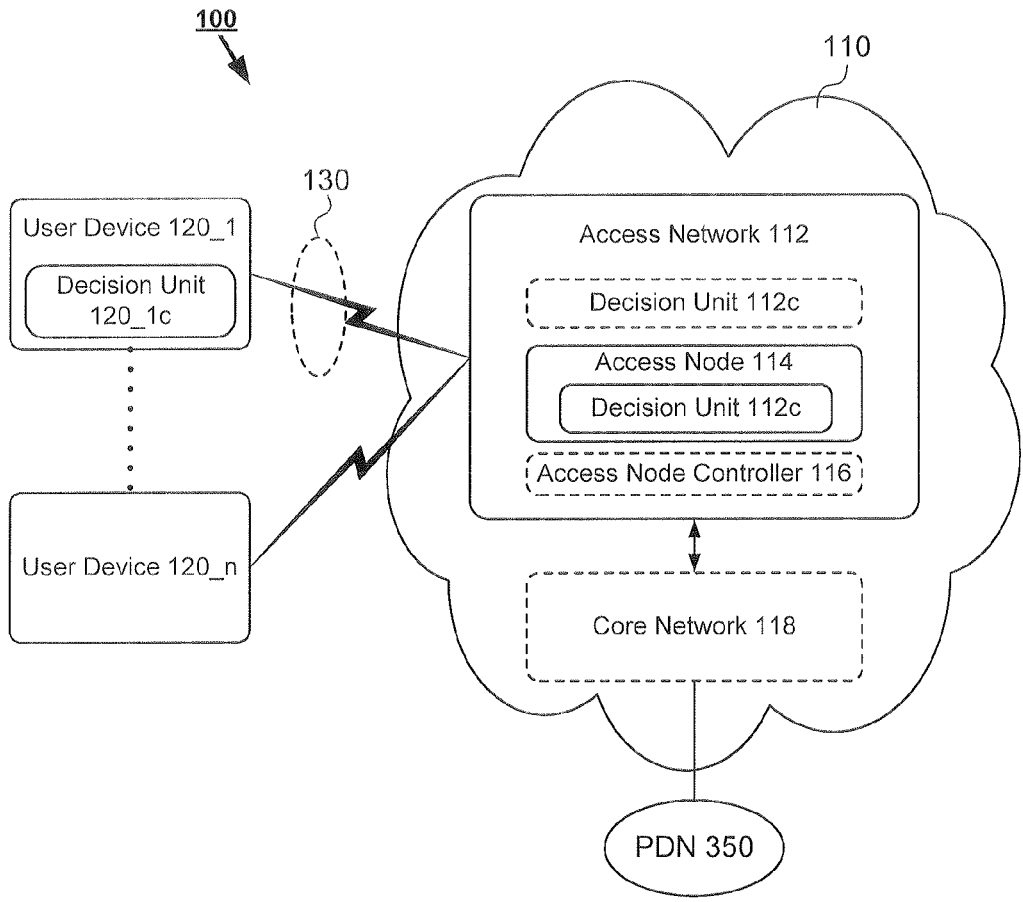
FIG. 3a is a schematic illustration of an exemplifying wireless communication system according to a first embodiment of the present invention.

FIG. 3a is a schematic illustration of an exemplifying wireless communication system 100 according to a first embodiment of the invention. The wireless communication system 100 may e.g. be a cellular or a non-cellular communication system, e.g. according to the standards of the 3GPP or similar, or the IEEE 802.11 or IEEE 802.16 or similar. The exemplifying communication system 100 comprises a plurality of user devices 120_1 to 120_n and a wireless communication network 110, which in turn comprises at least one wireless access network arrangement 112 as will be further described below.

Preferably, at least one user device 120_1 is a portable communication device configured to operatively communicate user data with the wireless access network 112 via a wireless link 130. The portable communication device may e.g. be a cell phone or a laptop computer or similar provided with the appropriate communication ability. Various portable communication devices and wireless links of this kind are well known per se to those skilled in the art and they need no detailed description as such.

The wireless access network arrangement 112 in FIG. 3a may comprise one or several access node arrangements 114, e.g. such as a base station or similar. Other embodiments may only comprise an access node arrangement 114, which then constitutes the whole access network 112. In addition, some embodiments of the access network 112 may comprise further components, e.g. an access node controller 116 for controlling a plurality of access node arrangements 114 or similar, e.g. a base station controller for controlling a number of base stations. The access network 112 is configured to communicate user data with at least one portable communication device 120_1 via the air interface 130. Various access networks such as the wireless access network arrangement 112, being or comprising an access node or similar, are well known per se to those skilled in the art and they need no detailed description as such.

In addition to the known features described above it is preferred that the wireless communication system 100 is configured to operatively select a transport format $TF_i$ among a plurality of available transport formats of increasing capacity for communicating information between the user device 120_1 and the access network 112 over the wireless link 130, as will be further elaborated later in connection with the description of the operation of embodiments of the invention. It is preferred that the selection is performed by a Decision Unit 112c in the access network 112 or a Decision Unit 120_1c in the user device 120_1. The Decision Unit 120_1c is preferably implemented by means of software and/or hardware in the user device 120_1. Similarly, the Decision Unit 112c is preferably implemented by means of software and/or hardware in the access network 112, e.g. in a separate dedicated unit and/or in a wireless access node arrangement 114 and/or in an access node controller 116.

It should be added that the wireless communication network 110 in FIG. 3a may comprise a core network arrangement 118. The core arrangement 118 may e.g. comprise a core node arrangement comprising one or several nodes. The core network 118 is preferably configured to operatively act as an interface between the wireless access network 112 and various external data networks or similar, e.g. such as a Packet Data Network (PDN) 350 or similar. The Internet is a well known example of a PDN.

The wireless access network 112 and the core network arrangement 118 are shown as separate units in FIG. 3a, which may be true for certain embodiments of the present invention. However, other embodiments may have the access network 112 and the core network 118 fully or at least partly arranged in the same physical and/or logical unit or units.

A Second Exemplifying Communication System

Figure 3B:
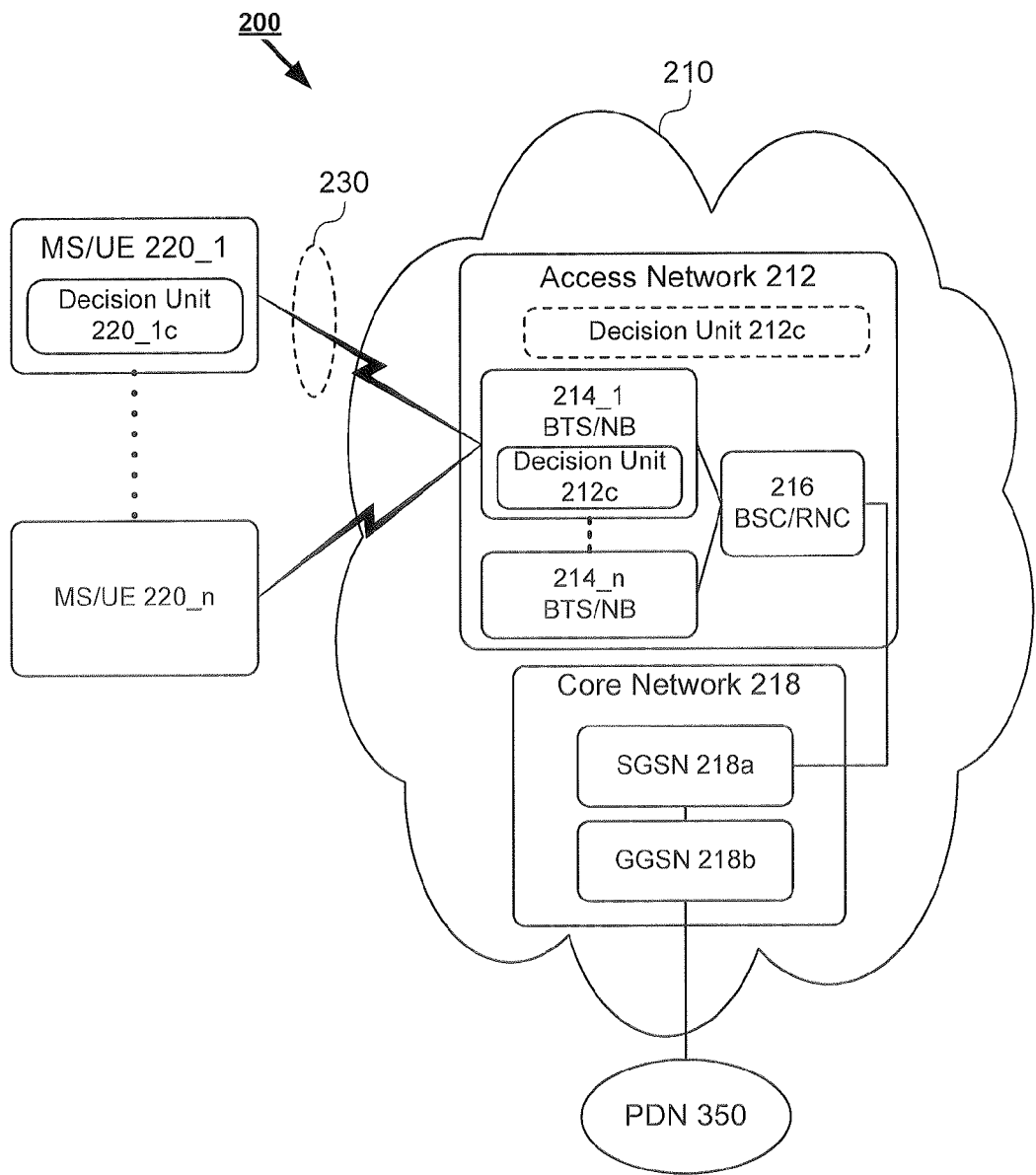
FIG. 3b is a schematic illustration of an exemplifying wireless communication system 200 according to a second embodiment of the present invention.

The attention is now directed to an exemplifying wireless communication system 200 according to a second embodiment of the present invention, as schematically illustrated in FIG. 3b. It is preferred that the system 200 is a cellular communication system, e.g. according to the Global System for Mobile communications (GSM) or the General Packet Radio Service (GPRS) as defined by the 3GPP.

The communication system 200 comprises a plurality of user devices 220_1 to 220_n or similar, and a wireless communication network 210. The wireless communication network 210 comprises a radio access network 212 and a core network 218. The observant reader realises that the system 200 is a specific embodiment of the system 100 in FIG. 3a. Thus, the user devices 220_1 to 220_n correspond to the user devices 120_1 to 120_n, the communication network 210 corresponds to the communication network 110, the radio access network 212 correspond to the wireless access network 112 and the core network 218 correspond to the core network arrangement 118.

The structure and operation of a communication system such as the exemplifying system 200 in FIG. 3b is well known per se to those skilled in the art and they need no detailed explanation. However, a brief overview is provided below.

It is preferred that the user devices 220_1 to 220_n are Mobile Stations (MS) or User Equipments (UE) as defined by the 3GPP, or similar devices with a similar function. Such devices are well known per se to those skilled in the art and they need no detailed description as such.

It is preferred that the radio access network 212 comprises one or several base stations 214_1 to 214_n or similar access node arrangements, e.g. Base Transceiver Stations (BTS) or NodeB (NB) or similar as defined by the 3GPP. Preferably, at least one base station 214_1 is configured to operatively communicate user data with at least one user device 220_1 via an air interface 230. Base Transceiver Stations (BTS) or NodeB (NB) and similar access node arrangements are well known per se to those skilled in the art and they do not need any detailed description as such.

It is preferred that the radio access network 212 comprises one or several base station controller arrangements 216 or similar. The base station controller arrangement 216 is preferably configured to operatively control the radio resources of a group of base stations 214_1 to 214_n. The base station controller arrangement 216 in FIG. 3b may e.g. be a Base Station Controller (BSC) or a Radio Network Controller (RNC) or similar as defined by the 3GPP. Base Station Controllers (BSCs) and/or a Radio Network Controllers (RNCs) or similar access node controllers are well known per se to those skilled in the art and they need no detailed description as such.

It is preferred that the core network 218 comprises a Serving Node 218a and a Gateway Node 218b or similar core network node arrangements. The Serving Node may e.g. be a Serving GPRS Support Node (SGSN) and the Gateway Node may e.g. be a Gateway GPRS Support Node (GGSN) as is well known to those skilled in the art. In FIG. 3b The Gateway Node 218b operates at one end of the core network 218 as an interface between the core network 218 and various external data networks, e.g. such as a Packet Data Network (PDN) 350. At another end of the core network 218 the Serving Node 218a operates as an interface between the core network 218 and at least one radio access network 212. The Serving Node 218a and the Gateway Node 218b are shown in FIG. 3b as separate units. However, other embodiments may have the Serving Node 218a and the Gateway Node 218b fully or at least partly arranged in the same physical and/or logical unit or units. Serving GPRS Support Nodes (SGSN) and Gateway GPRS Support Nodes (GGSN) or similar core network nodes are well known per se to those skilled in the art and they need no detailed description as such.

In addition, to the known features described above it is preferred that the wireless communication system 200 is configured according to an embodiment of the present invention so as to operatively select a transport format $TF_i$ among a plurality of available transport formats of increasing capacity for communicating information between the user device 220_1 and the access network 212 over the wireless link 230, as will be further elaborated later in connection with the description of the operation of embodiments of the invention. It is preferred that the selection is performed by a Decision Unit 212c in the access network 212 or by a Decision Unit 220_1c in the user device 220_1. The Decision Unit 220_1c is preferably implemented by means of software and/or hardware in the user device 220_1. Similarly, the Decision Unit 212c is preferably implemented by means of software and/or hardware in the access network 212, e.g. in a separate dedicated unit and/or in a base station 214_1 and/or in a base station controller 216.

A Third Exemplifying Communication System

Figure 3C:
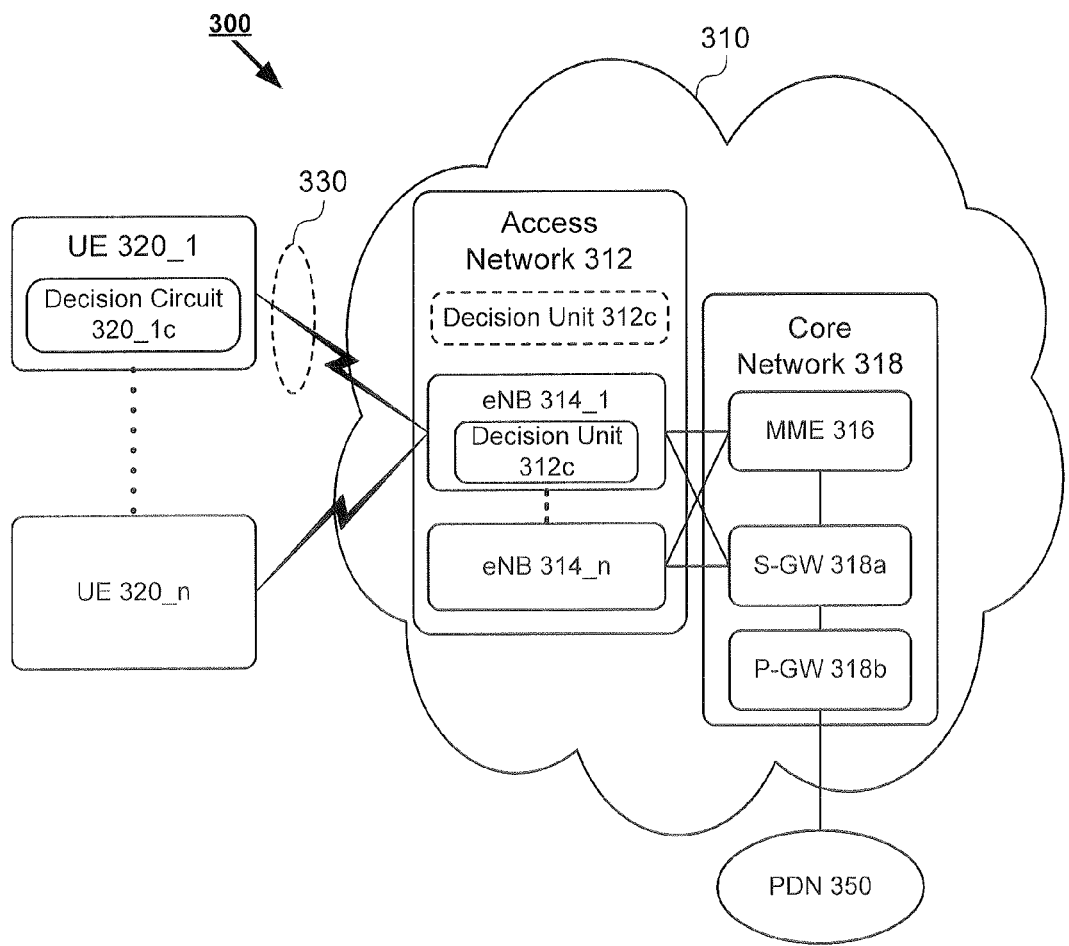
FIG. 3c is a schematic illustration of an exemplifying wireless communication system 300 according to a third embodiment of the present invention.

The attention is now directed to an exemplifying wireless communication system 300 according to a third embodiment of the present invention, as schematically illustrated in FIG. 3c. It is preferred that the system 300 is a cellular communication system, e.g. according to the Universal Mobile Telecommunication System (UMTS) as defined by the 3GPP, or rather enhancements of the UMTS such as the 3GPP Long Term Evolution (LTE) or similar.

The communication system 300 comprises a plurality of user devices 320_1 to 320_n or similar, and a wireless communication network 310. The wireless communication network 310 comprises a radio access network arrangement 312 and a core network arrangement 318. The observant reader realises that the system 300 is a specific embodiment of the system 100 in FIG. 3a. Thus, the user devices 320_1 to 320_n correspond to the user devices 120_1 to 120_n, the communication network 310 corresponds to the communication network 110, the radio access network 312 correspond to the wireless access network 112 and the core network 318 correspond to the core network arrangement 118. The system 300 in FIG. 3c is similar to the system 200 in FIG. 3b, however there is no base station controller arrangement 216 or similar in the radio access network arrangement 312 of the system 300.

The structure and operation of communication systems such as the exemplifying system 300 are well known per se to those skilled in the art and they need no detailed explanation. However, a brief overview is provided below.

In case of an LTE-system then the core network 318 corresponds to the Evolved Packet Core (EPC), whereas the radio access network 312 corresponds to the Evolved UMTS Terrestrial Radio Access Network (E-UTRAN).

In addition, in case of an LTE-system, it follows that the user devices 320_1 to 320_n are cell phones such as User Equipments (UE) or similar devices with similar functions. Thus the devices 320_1 to 320_n are the same or similar as the devices 220_1 to 220_n described above with reference to FIG. 3b.

In case of an LTE-system it also follows that the radio access network 312 comprises a plurality of base stations 314_1 to 314_n in the form of enhanced NodeB (eNB) or similar as defined by the 3GPP. The eNB 314_1 to 314_n are similar to the NB 214_1 to 214_n described above with reference to FIG. 3b. However, as mentioned above, there is no base station controller 216 in the radio access network 312. Instead, the radio functionality or similar of the base station controller 216 in system 200 is distributed and implemented in each eNB 314_1 to 314_n of the system 300.

In case of an LTE-system, the EPC 318 comprises at least one Serving Gateway 318a (S-GW) and at least one PDN Gateway (P-GW) 318b. The main task of the S-GW 318a is to tunnel user-data between a P-GW 318b and an eNB 314_1 to 314_n. The P-GW 318a is the interface between the internal IP network of the EPC 318 and various external Packet Data Networks (PDN) 350. It may be added that a S-GW and a P-GW can be combined and collocated in the same or neighbouring hardware as a matter of implementation for vendors of core networks.

In addition, to the known features described above it is preferred that the wireless communication system 300 is configured according to an embodiment of the present invention so as to operatively select a transport format $TF_i$ among a plurality of available transport formats of increasing capacity for communicating information between the user device 320_1 and the access network 312 over the wireless link 330, as will be further elaborated later in connection with the description of the operation of embodiments of the invention.

It is preferred that the selection is performed by a Decision Unit 312c in the access network 312 or by a Decision Unit 320_1c in the user device 320_1. The Decision Unit 320_1c is preferably implemented by means of software and/or hardware in the user device 320_1. Similarly, the Decision Unit 312c is preferably implemented by means of software and/or hardware in the access network 312, e.g. in a separate dedicated unit and/or in an eNB 314_1.

The above described user devices 120_1 to 120_n, 220_1 to 220_n, 320_1 to 320_n and/or the wireless access networks 112, 212, 312 and/or the core networks 118, 218, 318 acting as an interface between the access network arrangements and various external data networks may, without departing from the present invention, have other configurations departing from those described above.

Operation of Embodiments

Overview of the Operation of Certain Embodiments

In embodiments of the present invention a transport format among a plurality of available transport formats $TF_1$ to $TF_{15}$ is selected. The transport formats are such that the first transport format $TF_1$ has a first capacity $Thp_1$ and all the other transport formats $TF_2$ to $TF_{15}$ have a higher capacity in an increasing order. In other words, the capacity $Thp_1$ of transport format $TF_1$ is less than the capacity $Thp_2$ of transport format $TF_2$, which in turn is less than the capacity $Thp_3$ of transport format $TF_3$, and so on to the capacity $Thp_{14}$ of transport format $TF_{14}$, which is less than the capacity $Thp_{15}$ of transport format $TF_{15}$ having the highest capacity.

Expressed otherwise:

$$Thp_1 < Thp_2 < Thp_3 < Thp_4 < Thp_5 < Thp_6 < Thp_7 < Thp_8 < Thp_9 << Thp_{10} < Thp_{11} < Thp_{13} < Thp_{14} < Thp_{15}$$

Figure 1:
FIG. 1 is a schematic illustration of an exemplifying table A1 comprising transport formats TF0-TF15 and an exemplifying table 1B comprising Error Rate Targets according to an embodiment of the present invention.
Figure 2A:
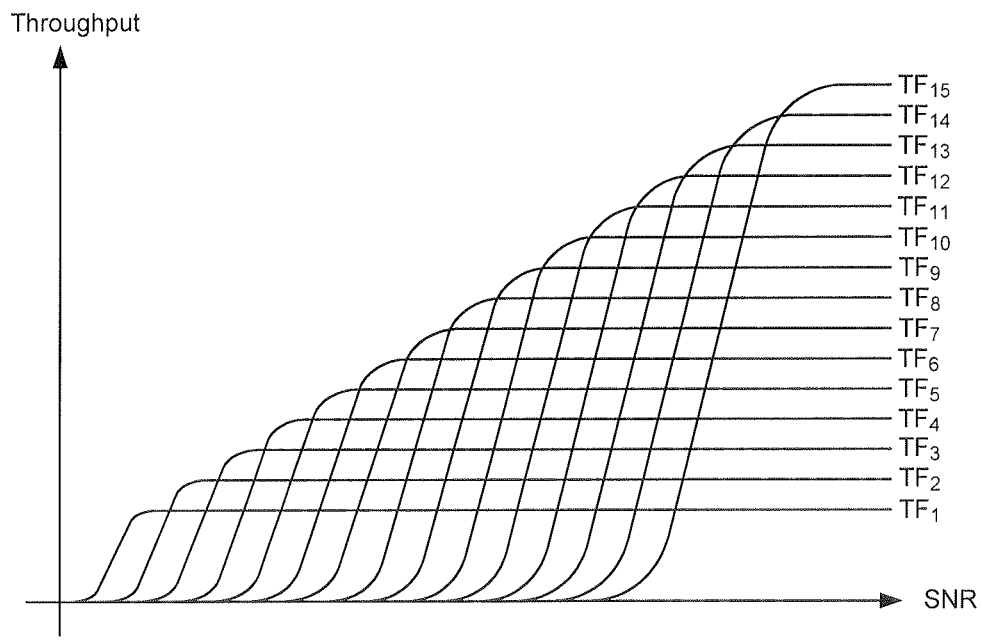
FIG. 2a is a schematic illustration of the throughput of each transport format TF1-TF15 in table 1A as a function of Signal to Noise Ratio (SNR).

This is illustrated in FIG. 2A showing exemplifying transport formats TF1 to TF15 of increasing capacity. The transport formats TF1 to TF15 correspond to the CQI-indexes 1-15 in table 1A of FIG. 1, wherein CQI-index 1 has a capacity that is less than that of CQI-index 2, which in turn has a capacity that is less than that of CQI-index 3 and so on to CQI-index 14 which has a capacity that is than the capacity of CQI-index 15 having the highest capacity.

Before we proceed it should be emphasised that there may be more or less transport formats than the fifteen transport formats shown in table 1A of FIG. 1 and in FIG. 2a. Furthermore, the available transport formats must not be predetermined, e.g. predetermined combinations of modulation and coding schemes or similar. In addition, the available transport formats may be of other types than those in table 1A of FIG. 1, e.g. comprising other combinations of modulation and coding schemes or similar.

Now, in the exemplifying embodiment illustrated in FIG. 1 and FIG. 2a-2c a transport format $TF_i$ is selected among the available transport formats $TF_1$ to $TF_{15}$ for communicating information between the sending node (e.g. an access node 114, 214_1, 314_1 or a user device 120_1, 220_1, 320_1) and a receiving node (e.g. a user device 120_1, 220_1, 320_1 or an access node 114, 214_1, 314_1) via a wireless link 130, 230, 330 as will be further described below.

Here, the link adaptation procedure is preferably designed to select among the set of available transport formats TF1-TF15 to maximize the throughput of the wireless link. One approach is to maximize the throughput for a certain channel, which is the envelope of the throughputs of transport formats TF1-TF15 in FIG. 2a. The switching values are then the cross-point on the y-axis, e.g. as indicated by TH2 for transport format $TF_i$ and $TF_{i+1}$ in FIG. 2c.

Figure 2B:
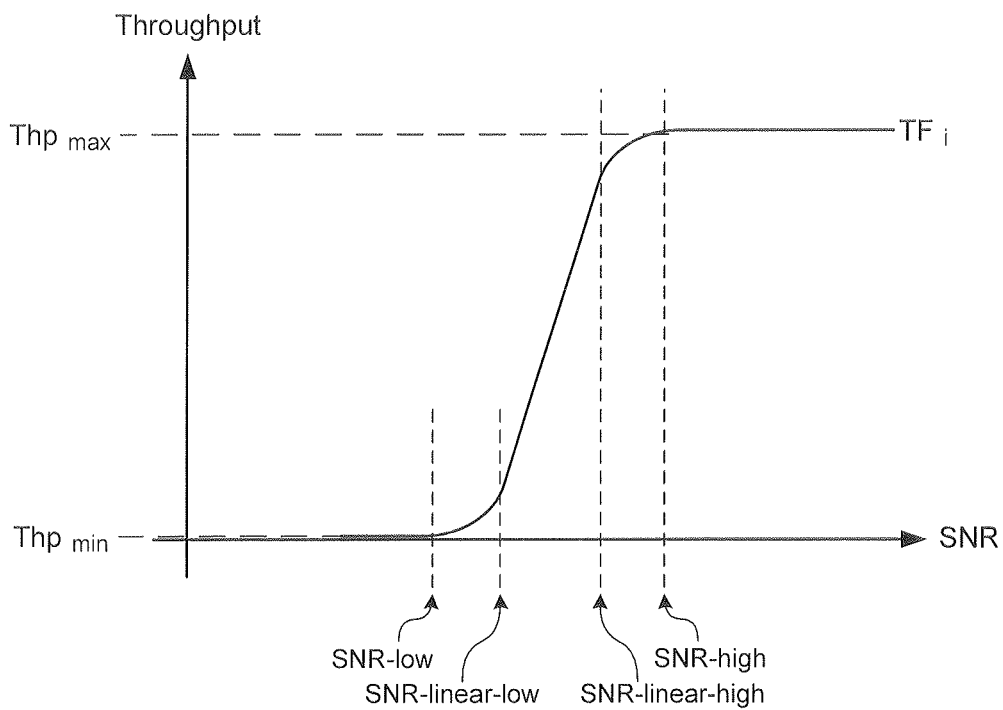
Figure 2C:
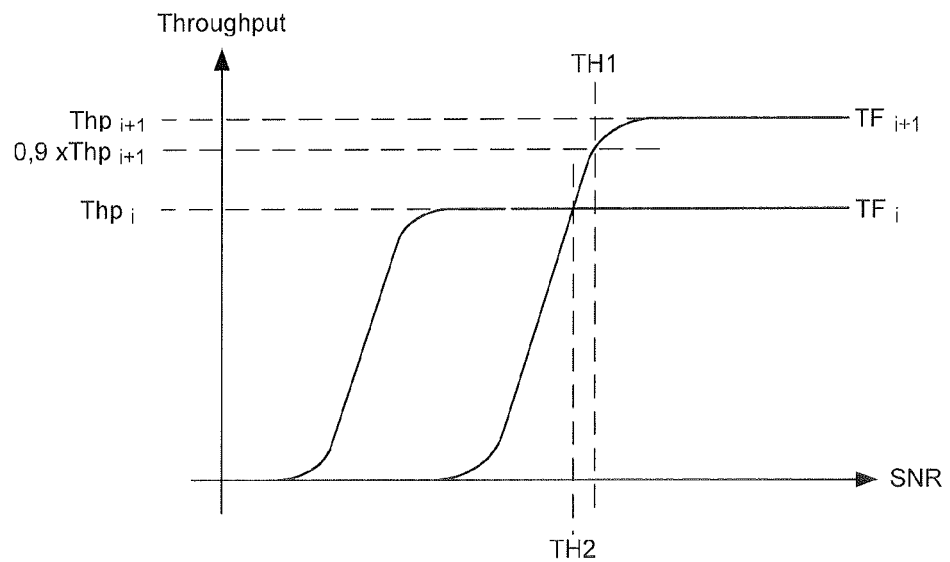
FIG. 2c is a schematic illustration showing a current transport format TFi+1 providing a higher throughput of Thpi+1 and a new transport format TFi providing a lower throughput Thpi.

Based on the static representations of the throughputs of the exemplifying transport formats TF1-TF15 as schematically illustrated in FIG. 2a-2c a rather good approximation of the switching value can e.g. be based on the maximum possible throughput of the transport formats $TF_i$, $TF_{i+1}$ in question, e.g. given by the following equation:

$$BLER_{thld,i} = 1 - Thp_i/Thp_{i+1} \quad (1)$$

Note that this is not necessarily a good approximation on the x-axis.

As already noted above, equation (1) is an approximation for which the optimal switching point between $TF_i$ and $TF_{i+1}$ occurs when $BLER_i=0$. In general this may not be the case and the switching points may be more accurately given by the points for which:

$$Thp_i(1-BLER_i) = Thp_{i+1}(1-BLER_{thld,i+1}) \quad (2)$$

The resulting BLER thresholds per transport format may then be used as a BLER target.

In equation (1) the switching value is represented by an error rate threshold in the form of a transport Block Error Probability target $BLER_{thld,i}$ or similar. The $BLER_{thld,i}$ is preferably calculated based on the maximum possible throughput $Thp_{i+1}$ of a first transport format $TF_{i+1}$ and the maximum possible throughput $Thp_i$ of a second transport format $TF_i$ being the next in order at a current SNR-value or similar.

The transport format is then switched from the first transport format $TF_{i+1}$ to the second transport format $TF_i$ when the calculated $BLER_{thld}$ is reached. Applying equation (1) on the transport formats TF1-TF15, corresponding to the CQI-indexes 1-15 in table 1A of FIG. 1 results in a set of error rate targets as shown in table 1B right column of FIG. 1. As can be deducted from equation (1) and table 1B, a certain transport format $TF_{i+1}$ is maintained at a certain SNR-value or at a certain SNR-value-interval or similar until the BLER value or HARQ BLER value or similar reaches the calculated $BLER_{thld,i+1}$. Then the transport format is switched to the next transport format $TF_i$ being the next in order at the current SNR-value or similar. For example, according to table 1B in FIG. 1 the transport format is switched from CQI-index 15 to 14 when the BLER value or HARQ BLER value or similar reaches 8% and from CQI-index 14 to 13 when the BLER value or similar reaches 12% and so on.

In other words, in this case a certain transport format $TF_{i+1}$ is maintained at a certain SNR-value or at a certain SNR-value-interval indicated by a certain SNR-value or similar until the error rate rises to such an extent that the throughput of the transport format $TF_{i+1}$ becomes substantially equal to the maximum throughput of the next transport format $TF_i$ in throughput order. From this it is clear that the thresholds also can be set in SNR-domain rather than according to an error rate such as BLER or similar. This can be suitable in uplink since SNR-measures are available in eNodeB. In downlink the thresholds can also be set in CQI domain and TF selection based on average filtered CQI.

Equation (1) is one of several embodiments of the invention that enables a CQI reporting from the user device as defined according FIG. 1 (right column) rather than switching 10% between all transport formats as typically defined.

To summarize, equation (1) provides good throughput-optimal switching points for the transport formats TF1-TF15, resulting in different error rate targets in different ranges of the SNR or similar. Since a reported CQI provides information about the possible range for the current SNR, this information can be used to set a proper error rate target for an outer-loop CQI adjustment algorithm.

However, the throughput-optimal switching points obtained by means of equation (1) does not take into account the probability distribution for the SNR with respect to observed reported CQI values.

To this end, we may let $p_{CQI}(SNR)$ denote the estimated probability distribution for the SNR at the transmission instance, where the actual SNR at the (future) transmission instance is regarded as a random variable whose probability distribution function is given by $p_{CQI}(SNR)$. The estimated probability distribution $p_{CQI}(SNR)$ can e.g. be based on the statistics of the reported CQI or it may be a function purely dependent on the latest reported CQI.

Link simulations like the one illustrated in FIG. 2a-2c give that the reported CQI matches a lower range $SNR_{low}(CQI)$ for the SNR or similar and a upper range $SNR_{high}(CQI)$.

The ranges of SNR values $S_{CQI}$ matched by the reported CQI values may then be defined by the interval:

$$S_{CQI} = [SNR_{low}(CQI), SNR_{high}(CQI)] \quad (3)$$

Then the subinterval $S_{CQI}(i)$ of the interval $S_{CQI}$ for which a transport format $TF_i$ is throughput optimal according to equation (1) can be denoted by:

$$S_{CQI}(i) \subseteq S_{CQI} \quad (4)$$

In addition, the set of transport formats that are throughput optimal according to equation (1) or similar somewhere in the interval $S_{CQI}$ can be denoted $I_{CQI}$.

This means that the $S_{CQI}(i)$ where $i \in I_{CQI}$, forms a partition of $S_{CQI}$ such that $$S_{CQI} = \sum_{I_{CQI}} S_{CQI}(i) \quad (5)$$

Now, the $BLER_{CQI,i}(SNR)$, being the BLER at a certain SNR or similar when using a certain transport format $TF_i$, can e.g. be calculated and/or estimated by means of link simulations as those schematically illustrated in FIG. 2a-2c or similar.

The expected throughput optimal $BLER_{CQI}$ when observing a certain CQI can then be calculated as:

$$BLER_{CQI} = \sum_{i \in I_{CQI}} \int_{S_{CQI}(i)} BLER_{CQI,i}(SNR) p_{CQI}(SNR) dSNR \quad (6)$$

As described above, the $BLER_{CQI,i}(SNR)$ is preferably the BLER at a certain SNR when using a certain transport format $TF_i$. As likewise described above, the $p_{CQI}(SNR)$ is preferably denoting the estimated probability distribution function for the SNR based on observed CQI values.

Thus, $BLER_{CQI}$ is the expected BLER given the observed CQI when making the throughput optimal TF selection. In other words, $BLER_{CQI}$ is the BLER that can be expected if optimal TF selection is made.

The expected throughput optimal $BLER_{CQI}$ can be used directly as a BLER target for an outer loop.

$BLER_{CQI}$ is, as said above, the expected BLER when making a throughput optimal TF selection. Link Adaptation (LA) can try to make a throughput optimal TF choice or it can just follow the suggestion given by the CQI report. In both these cases there is a potential need to have an outer-loop that takes care of channel estimation errors in the CQI report and/or discrepancies in true throughput curves and the modeled (e.g. from link simulations) throughput curves. Here, the Acknowledge and Negative-Acknowledge messages or similar (AckNacks), received by a transmitter from a receiver as is well known to those skilled in the art, may provide estimates of the true BLER which can be compared with (corresponding) $BLER_{CQI}$. If the BLER estimate is lower than $BLER_{CQI}$ the LA has been too conservative in the TF selection and higher TF would give higher throughput. As a result the LA could make proper adjustments to be more aggressive in the TF selection. For example, with AckNack triggered outer-loop could increase (resulting in more aggressive TF choice) the adjustment.

So far in our discussions the transport format has been switched to a more throughput-optimal transport format when a calculated error rate target is reached. This approach is suitable when an outer-loop adjusting transport format selection is used. However, in other embodiments the transport format is switched to a more throughput-optimal transport format based on an optimization without necessarily using any outer loop.

To this end, the throughput $thp_i(SNR)$ at a certain SNR or similar when using a certain transport format $TF_i$ can e.g. be calculated and/or estimated by means of link simulations e.g. as those schematically illustrated in FIG. 2a-2c.

The expected throughput $thp_i(CQI)$ when observing a certain CQI and when using a certain transport format $TF_i$ can then be calculated as:

$$thp_i(CQI) = \int_{SNR(CQI)} thp_i(SNR) p_{CQI}(SNR) dSNR. \quad (7)$$

As described above, the $thp_i(SNR)$ is preferably the throughput at a certain SNR or similar when using a certain transport format $TF_i$, and $p_{CQI}(SNR)$ is preferably denoting the estimated probability distribution function for the SNR based on reported CQI values.

The TF(CQI), when observing a certain CQI, can then be selected as:

$$TF(CQI) = \underset{i \in S_{TF}}{\arg\max} \, thp_i(CQI). \quad (8)$$

As described above, $thp_i(CQI)$ is the expected throughput when observing a certain CQI and when using a certain transport format $TF_i$ Here, the switching value is calculated such that the maximum throughput of the available transport formats at the observed CQI is obtained. A first transport format is then switched to a second transport format if the second transport format has the maximum throughput at the observed CQI, i.e. if the throughput of the second transport format reaches the switching value.

An outer-loop could be combined with the optimization procedure in equation (7). The target BLER for the outer-loop should then equal the estimated BLER for the chosen TF, which can be calculated as:

$$BLER(TF(CQI)) = \quad (9)$$
$$\int_{SNR(CQI)} (thp_{TF(CQI),max} - thp_{TF(CQI)}(SNR)) p_{CQI}(SNR) dSNR$$

where $thp_{TF(CQI),max}$ is the maximum throughput possible for transport format TF(CQI) and $thp_{TF(CQI)}(SNR)$ is preferably the expected throughput at a certain SNR or similar when using transport format TF(CQI), whereas $p_{CQI}(SNR)$ is preferably denoting the estimated probability distribution function for the SNR based on reported CQI values.

However, the channel variations for a wireless link cause uncertainties about the channel conditions at the actual transmission instances. Since the channel conditions may display large and fast variations there may be large uncertainties in the reported CQI. Also, a uniform distribution of SNR for a certain CQI is a less accurate assumption. Moreover, in uplink the SNR is available in eNodeB enabling a better estimation of SNR distribution. Therefore, using the reported CQI as a prediction of the CQI at the transmission instance may be less advantageous at some instances. The uncertainties in the reported CQI and the corresponding estimated SNR can be taken into account when estimating the SNR distribution.

To this end, we may let a function $f_{CQI}(q)$ denote the estimated probability distribution for the CQI at the transmission instance, where the actual CQI at the (future) transmission instance is regarded as a random variable whose probability distribution function is given by $f_{CQI}(q)$. It is preferred that the $f_{CQI}(q)$ is estimated per user device based on reported CQI. Then the selection of a transport format can be defined as:

$$TF(f_{CQI}) = \underset{i \in S_{TF}}{\arg\max} \sum_{q \in CQI} thp_{f_{CQI},i}(q) \quad (10)$$

In the equation above $S_{TF}$ is the set of transport formats and $thp_{f_{CQI},i}(q)$ is the expected throughput estimate when using transport format $TF_i$ if the true channel would have CQI=q at the transmission instance. Thus, $thp_{f_{CQI},i}(q)$ will include a total SNR distribution estimate taking the CQI distribution into account.

One possibility for forming $thp_{f_{CQI},i}(q)$ is given by:

$$thp_{f_{CQI},i}(q) = \int_{SNR(q)} thp_i(SNR) p_q(SNR) f_{CQI}(q) dSNR \quad (11)$$
$$= thp_i(q) f_{CQI}(q)$$

Here, we have put $p_{f_{CQI},q}(SNR) = p_q(SNR) f_{CQI}(q)$.

As described above, the $thp_i(SNR)$ is preferably the throughput at a certain SNR or similar when using a certain transport format $TF_i$, and $p_q(SNR)$ is preferably denoting the estimated probability distribution function for the SNR for each CQI value, whereas $f_{CQI}(q)$ denotes the estimated probability function for the CQI.

Then the selection of a transport format can be defined as:

$$TF(f_{CQI}) = \underset{i \in S_{TF}}{\arg\max} \sum_{q \in CQI} thp_i(q) f_{CQI}(q) \quad (12)$$

In the case where SNR measure is available (such as in LTE uplink) the SNR distribution estimation is more straight forward and simplified.

Again as previously mentioned there may be a need to combine this with an outer-loop. In this case equation (10) is complemented with an adjustment term which is controlled by an AckNack triggered control loop. The target BLER should then be the expected/predicted BLER when selecting the TF according to equation (10) including the current adjustment term. The expected/predicted BLER could, of course, be filtered before being used as BLER target. If the true BLER estimate (which may be filtered as well) is lower than the target BLER then the adjustment term is increased.

$$BLER(TF(f_{CQI})) = \int_{SNR(q)} (thp_{TF(f_{CQI}),max} - thp_{TF(f_{CQI})}(SNR)) p_{f_{CQI}}(SNR) dSNR \quad (13)$$

where we could set $$p_{f_{CQI}}(SNR) = \sum_{q \in CQI} p_q(SNR) f_{CQI}(q) \quad (14)$$

Specific Operations of Certain Embodiments

Figure 4A:
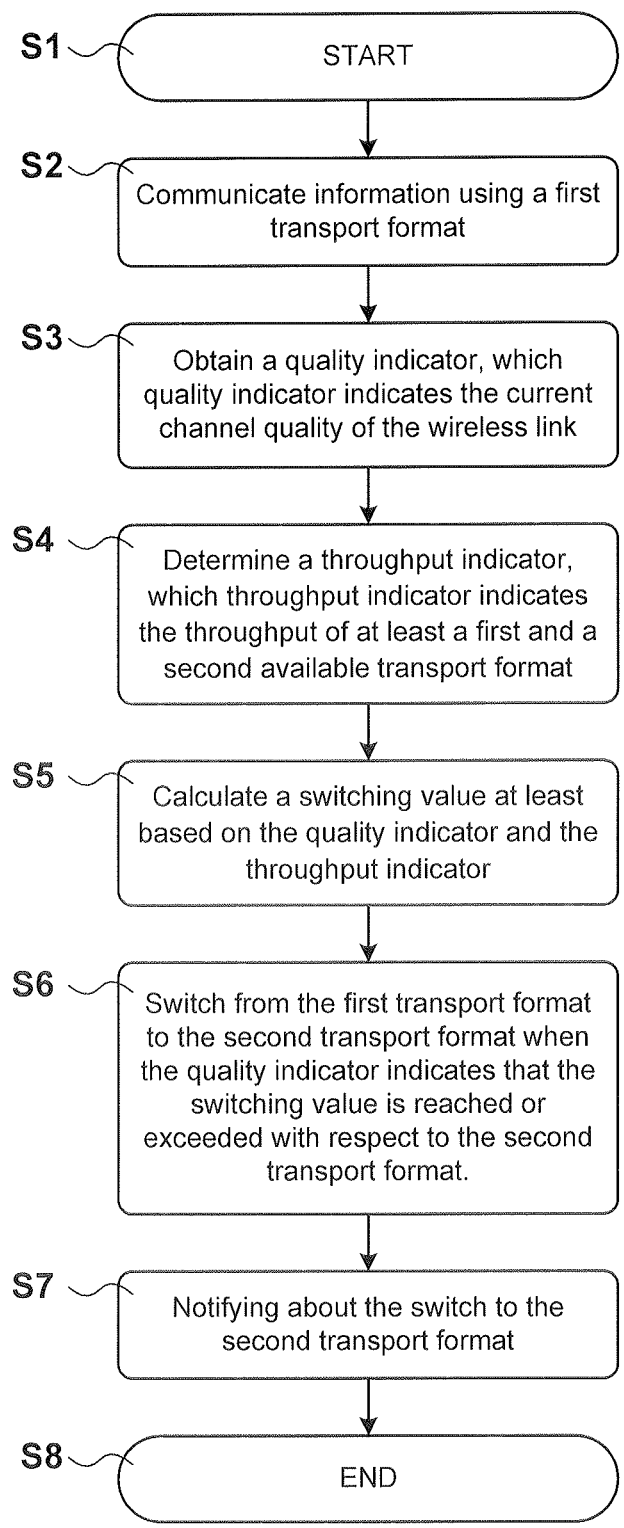
FIG. 4a is a schematic flowchart illustrating the operation of an embodiment of the present invention.
Figure 4B:
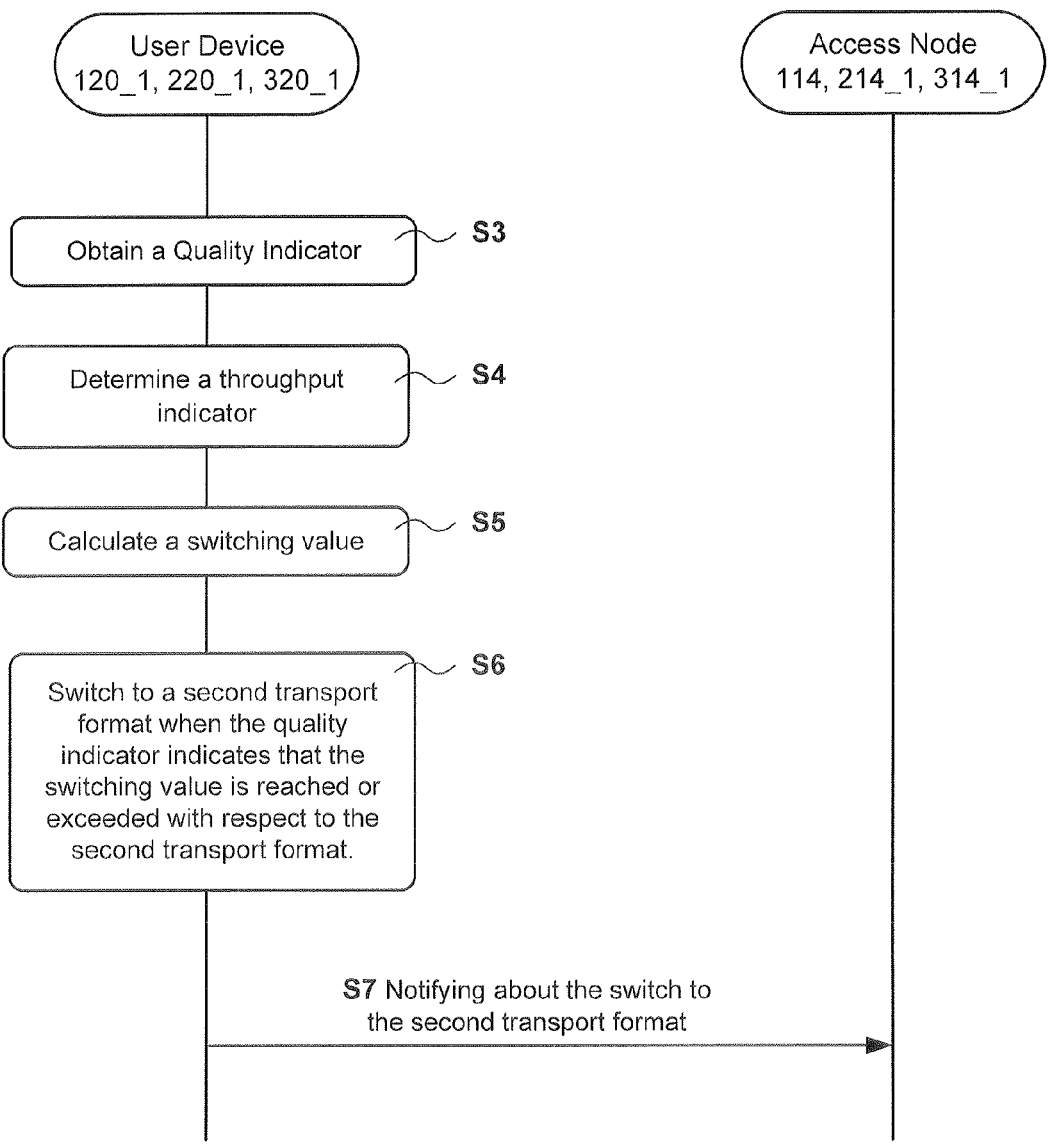
FIG. 4b is a schematic sequence diagram illustrating the operation of a downlink embodiment of the present invention.
Figure 4C:
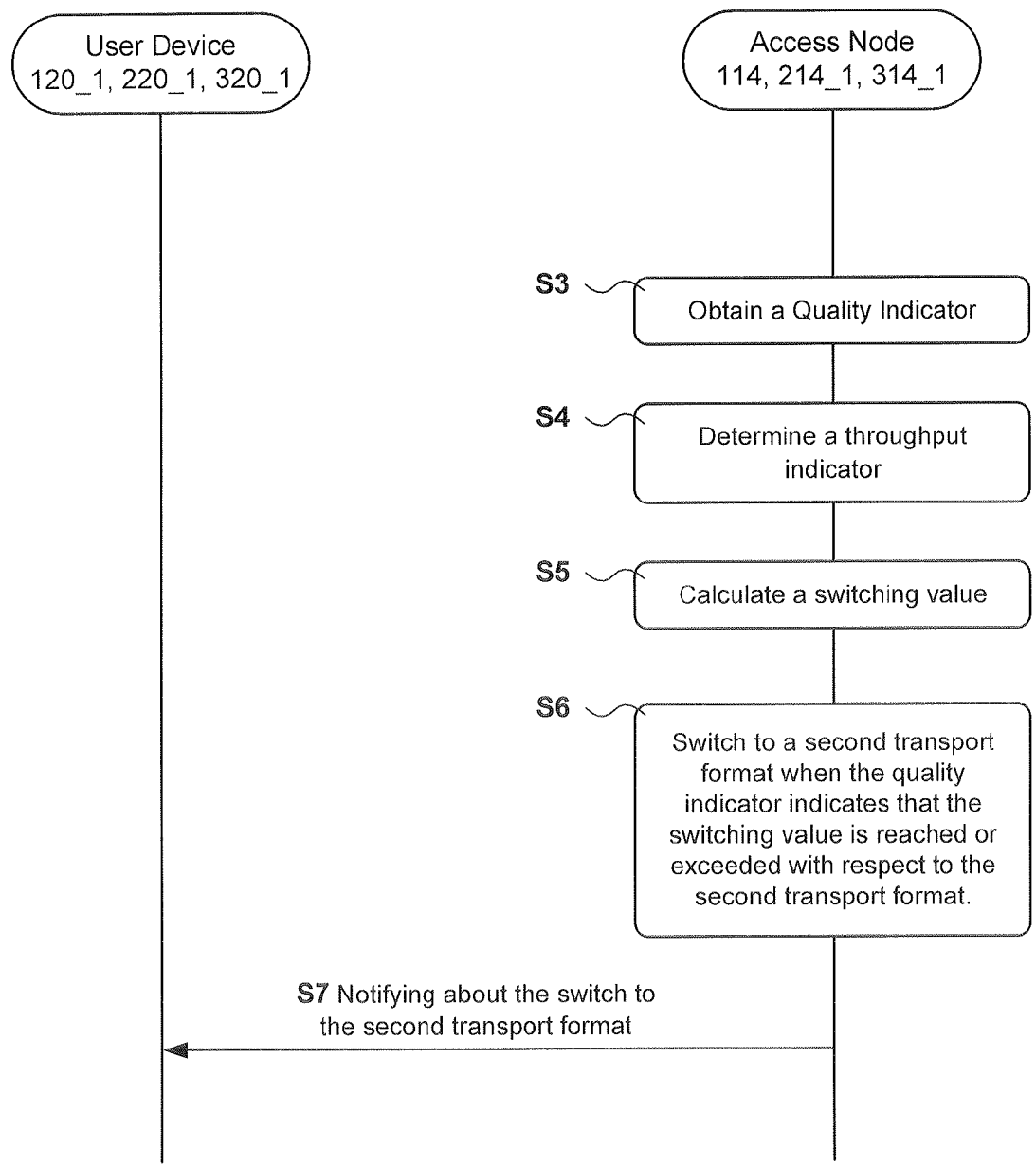
FIG. 4c is a schematic sequence diagram illustrating the operation of an uplink embodiment of the present invention.

The attention is now directed to a schematic flowchart shown in FIG. 4a and schematic sequence diagrams shown in FIG. 4b and FIG. 4c, which illustrates the operation of exemplifying embodiments of the present invention. The operation is preferably performed by a Decision Unit 112c, 212c, 312c in a network node, such as an access node 114, 214_1, 314_1, e.g. a base station or similar, or even more preferably in a network node such as a user device 120_1, 220_1, 320_1. However, this does not preclude that the operation can be at least partly performed by a Decision Unit fully or at least partly arranged in other parts of an access network arrangement 112, 212, 312 being a part of the communication system 100, 200, 300.

The steps of the exemplifying operation illustrated by the flowchart in FIG. 4a will now be discussed in more detail below.

In a first step S1 it is preferred that the wireless communication system 100, 200, 300 has been activated. It is also preferred that at least one user device 120_1, 220_1, 320_1 (e.g. a cell phone or similar) of the communication system 100, 200, 300 is within the range of at least one wireless access node 114, 214_1, 314_1 (e.g. a base station or similar) of the communication system 100, 200, 300. For the purpose of describing embodiments of the present invention the access node 114, 214_1, 314_1 and the user device 120_1, 220_1, 320_1 are both considered as "network nodes".

In a second step S2 it is preferred that a first transport format is used for communicating information to a first network node from a second network node via a wireless link 130, 230, 330. In the following it is assumed that the first network node is a user device 120_1, 220_1, 320_1 and the second network node is an access node 114, 214_1, 314_1 as illustrated in FIG. 4b. However, the observant reader realizes that the description applies mutatis mutandis when the first network node is an access node 114, 214_1, 314_1, and the second network node is a user device 120_1, 220_1, 320_1 as illustrated in FIG. 4c.

Before we proceed it should be noted that the first transport format used in step S2 may indeed be selected according to an embodiment of the present invention. However, this is not required. On the contrary, the first transport format used in step S2 may, without departing from the present invention, be selected in any suitable manner.

In a third step S3 it is preferred that a quality indicator is obtained by the first network node. It is preferred that the quality indicator indicates the current channel quality of the wireless link 130, 230, 330. The quality indicator may e.g. be a so-called Channel Quality Indicator (CQI) or similar, e.g. such as the CQI or similar derived by an UE or similar within the framework of the 3GPP specifications. The quality indicator may also be some other well known measure of channel quality, e.g. a Signal-to-Noise-Ratio (SNR) or a Signal-to-Interference-Ratio (SIR) or similar, which e.g. may be derived or otherwise available by base stations such as NodeB or eNodeB or similar within the framework of the 3GPP specifications.

In a fourth step S4 it is preferred that a throughput indicator is determined. It is preferred that the throughput indicator indicates the throughput of the first transport format and at least a second transport format being available to the first network node. The throughput may e.g. be a maximum throughput or an estimated throughput or an expected throughput or similar. The throughput indicator may indicate the throughput for a subset of the available transport formats or it may indicate the throughput for all or substantially all transport formats being available to the first network node.

The throughput indicator may e.g. be provided in the form of a table arrangement or similar. For example, such as the table arrangement 1A and 1B shown in FIG. 1 or similar, which defines or indicates the throughput for different transport formats TF1-TF15 (which may correspond to different CQI-indexes, see table 1A), and an error rate or error rate target for each transport format TF1-TF14 (see the percentages in right column of table 1B). The throughput indicator may be determined by simply providing the first network node and/or the second network node with a predetermined throughput indicator in the form of a table arrangement or similar. Such throughput indicators may be dynamically updated, e.g. by providing a new throughput indicator when needed, e.g. if the available transport should be redefined and/or if any other property in the throughput indicator should be changed.

Alternatively, according to equations (7) or (11) the throughput indicator may be represented by an estimated throughput for each available transport format (i.e. the transport format available to the first network node), which transport formats are estimated at the quality indicator obtained in step S3 (e.g. at the CQI or SNR or similar obtained in step S3) and adjusted by at least one of: an estimated distribution of the channel quality indicated by the obtained quality indicator and/or an estimated distribution of the obtained quality indicator that indicates the current channel quality.

In a fifth step S5 it is preferred that a switching value is calculated based on the quality indicator obtained in step S3 and the throughput indicator determined in step S4.

According to equation (1) the switching value may e.g. be represented by an error rate being calculated based on the throughput of the first transport format and the throughput of a second transport format being the next in order at said quality indicator. Then, in the next step S6, the first transport format may be switched to the second transport format when the quality indicator indicates that the calculated error rate is reached.

Alternatively, according to equation (6) the switching value may be represented by an estimated error rate calculated based on an estimation of the error rate for the first transport format at the quality indicator obtained in step S3, and on a distribution of the channel quality of the wireless link at said quality indicator. Then, in the next step S6, the first transport format may be switched to a second transport format, being the next in order at said quality indicator, when the quality indicator indicates that the calculated error rate is reached.

Alternatively, according to equations (8), (10) or (12) the switching value may be calculated by obtaining the maximum throughput of the available transport formats at the quality indicator obtained in step S3. For example, in equation (8) the maximum throughput may e.g. be based on an expected throughput at a certain SNR or similar when using a certain transport format $TF_i$ possibly adjusted for the estimated probability distribution function for the SNR based on reported CQI values. In another example according to equation (10) the maximum throughput may e.g. be based on an expected throughput estimate when using transport format $TF_i$ assuming that the true channel would have CQI=q at the transmission instance. Then, in the next step S6, the first transport format may be switched to a second transport format when the quality indicator indicates that the second transport format has reached the switching value.

In a sixth step S6 it is preferred that the first transport format is switched to a second transport format when the quality indicator indicates that the switching value is reached or exceeded.

In accordance with equation (1) the first transport format may be switched to the second transport format when the quality indicator indicates that the calculated error rate is reached.

In accordance with equation (6) the first transport format may be switched to a second transport format, being the next in order at said quality indicator, when the quality indicator indicates that the calculated error rate is reached.

In accordance with equations (8), (10) or (12) the first transport format may be switched to a second transport format when the quality indicator indicates that the second transport format has reached the switching value.

In a seventh step S7 it is preferred that the second network node is notified by the first network node about the switch to the second transport format.

The method is preferably terminated in an eighth step S8.

The present invention has now been described with reference to exemplifying embodiments. However, the invention is not limited to the embodiments described herein. On the contrary, the full extent of the invention is only determined by the scope of the appended claims.

The invention claimed is:

1. A method, in a first network node, for selecting a transport format from among a plurality of available transport formats ($TF_i$, $TF_{i+1}$) for communicating with a second network node via a wireless link, which transport formats are such that a first transport format has a first maximum capacity and all the other transport formats have a higher maximum capacity in an increasing order, the method comprising:
   obtaining a quality indicator, CQI or SNR, which quality indicator, CQI or SNR, indicates the current channel quality of the wireless link;
   determining a throughput indicator, which throughput indicator ($thp_i(CQI)$, $thp_{f_{CQI},i}(q)$), at said quality indicator, CQI or SNR, for each available transport format ($TF_i$), is calculated as:

$$thp_i(CQI) = \int_{SNR(CQI)} thp_i(SNR) p_{CQI}(SNR) \, dSNR$$

or $$thp_{f_{CQI},i}(q) = \int_{SNR(q)} thp_i(SNR) p_q(SNR) f_{CQI}(q) \, dSNR$$

wherein $thp_i(SNR)$ is the throughput at a certain SNR when using a certain transport format, SNR(CQI) is the range of SNR distribution as a function of CQI, $p_{CQI}$(SNR) is the estimated probability distribution function for the SNR based on reported CQI values, SNR(q) is the range of SNR distribution as a function of q, wherein q is a given CQI, $p_q$(SNR) is the estimated probability distribution function for the SNR for each CQI value, wherein q is a given CQI, and $f_{CQI}(q)$ is the estimated probability function for the CQI at a transmission instance, wherein q is a given CQI;
   finding a throughput optimal transport format (TF(CQI), TF($f_{CQI}$)) that gives a maximum among the throughput indicators ($thp_i(CQI)$) or that maximizes a weighted sum of the throughput indicators ($thp_{f_{CQI},i}(q)$);
   switching to the throughput optimal transport format (TF(CQI), TF($f_{CQI}$)); and
   sending a notification to the second node, which notification indicates the switch to the throughput optimal transport format (TF(CQI), TF($f_{CQI}$)).

2. The method of claim 1, wherein the finding of the throughput optimal transport format (TF(CQI), TF($f_{CQI}$)) further comprises:
   finding the throughput optimal (TF(CQI), TF($f_{CQI}$)) as:

$$TF(CQI) = \arg\max_{i \in S_{TF}} thp_i(CQI)$$

wherein $thp_i(CQI)$ is the expected throughput when observing a certain CQI and when using a certain transport format $TF_i$, and wherein $S_{TF}$ is the set of transport formats, or $$TF(f_{CQI}) = \arg\max_{i \in S_{TF}} \sum_{q \in CQI} thp_{f_{CQI},i}(CQI)$$

wherein $thp_{f_{CQI},i}(CQI)$ is the expected throughput estimate when using a transport format $TF_i$ if the true channel would have CQI=q at the transmission instance, and wherein $S_{TF}$ is the set of transport formats, or $$TF(f_{CQI}) = \arg\max_{i \in S_{TF}} \sum_{q \in CQI} thp_i(q) f_{CQI}(q)$$

wherein $thp_i(q)$ is the expected throughput when observing a certain q and when using a certain transport format $TF_i$, $f_{CQI}(q)$ is the estimated probability distribution for the CQI at the transmission instance, wherein q is a given CQI and wherein $S_{TF}$ is the set of transport formats.

3. The method of claim 1, wherein sending a notification is performed by sending a Channel Quality Indication Index (CQI-index) associated with the throughput optimal transport format (TF(CQI), TF($f_{CQI}$)).

4. The method of claim 1, wherein the available transport formats ($TF_i$, $TF_{i+1}$) having a higher capacity in an increasing order are associated with quantified indexes (CQI indexes) of increasing order.

5. The method of claim 1, wherein the throughput indicator ($thp_i(CQI)$, $thp_{f_{CQI},i}(q)$) is represented by an estimated throughput ($thp_i(SNR)$) including retransmission gain at said quality indicator CQI or SNR.

6. The method of claim 1, wherein the method is performed in a first network node being a user device or an access node.

7. A first network node configured to operatively select a transport format among a plurality of available transport formats ($TF_i$, $TF_{i+1}$) for communicating with a second network node via a wireless link, which transport formats are such that a first transport format has a first maximum capacity and all the other transport formats have a higher maximum capacity in an increasing order, wherein the first network node is configured to:
  obtain a quality indicator, CQI or SNR, which quality indicator, CQI or SNR, indicates the current channel quality of the wireless link;
  determine a throughput indicator, which throughput indicator ($thp_i(CQI)$, $thp_{f_{CQI},i}(q)$), at said quality indicator, CQI or SNR, for each available transport format ($TF_i$), is calculated as:

$$thp_i(CQI) = \int_{SNR(CQI)} thp_i(SNR) p_{CQI}(SNR) \, dSNR$$

or $$thp_{f_{CQI},i}(q) = \int_{SNR(q)} thp_i(SNR) p_q(SNR) f_{CQI}(q) \, dSNR$$

wherein $thp_i(SNR)$ is the throughput at a certain SNR when using a certain transport format, $SNR(CQI)$ is the range of SNR distribution as a function of CQI, $p_{CQI}(SNR)$ is the estimated probability distribution function for the SNR based on reported CQI values, $SNR(q)$ is the range of SNR distribution as a function of q, wherein q is a given CQI, $p_q(SNR)$ is the estimated probability distribution function for the SNR for each CQI value, wherein q is a given CQI, and $f_{CQI}(q)$ is the estimated probability function for the CQI at a transmission instance, wherein q is a given CQI;
  find a throughput optimal transport format ($TF(CQI)$, $TF(f_{CQI})$) that gives a maximum among the throughput indicators ($thp_i(CQI)$) or that maximizes a weighted sum of the throughput indicators ($thp_{f_{CQI},i}(q)$);
  switch to the throughput optimal transport format ($TF(CQI)$, $TF(f_{CQI})$); and
  send a notification to the second node, which notification indicates the switch to the throughput optimal transport format ($TF(CQI)$, $TF(f_{CQI})$).

8. The first network node of claim 7, wherein the first node is further configured to operatively:
  find the throughput optimal TF ($TF(CQI)$, $TF(f_{CQI})$) as:

$$TF(CQI) = \underset{i \in S_{TF}}{\arg\max} \, thp_i(CQI)$$

wherein $thp_i(CQI)$ is the expected throughput when observing a certain CQI and when using a certain transport format $TF_i$, and wherein $S_{TF}$ is the set of transport formats, or $$TF(f_{CQI}) = \underset{i \in S_{TF}}{\arg\max} \sum_{q \in CQI} thp_{f_{CQI},i}(CQI)$$

wherein $thp_{f_{CQI},i}(CQI)$ is the expected throughput estimate when using a transport format $TF_i$ if the true channel would have CQI=q at the transmission instance, and wherein $S_{TF}$ is the set of transport formats, or $$TF(f_{CQI}) = \underset{i \in S_{TF}}{\arg\max} \sum_{q \in CQI} thp_i(q) f_{CQI}(q)$$

wherein $thp_i(q)$ is the expected throughput when observing a certain q and when using a certain transport format $TF_i$, $f_{CQI}(q)$ is the estimated probability distribution for the CQI at the transmission instance, wherein q is a given CQI and wherein $S_{TF}$ is the set of transport formats.

9. The first network node of claim 7, wherein the first node is further configured to operatively notify the second network node by sending a Channel Quality Indication Index (CQI-index) associated with the throughput optimal transport format ($TF(CQI)$, $TF(f_{CQI})$).

10. The first network node of claim 7, wherein the first node is further configured to operatively switch between available transport formats ($TF_i$, $TF_{i+1}$) having a higher capacity in an increasing order and associated with quantified indexes (CQI index) of an increasing order.

11. The first network node of claim 7, wherein the first node is further configured to operatively determine the throughput indicator ($thp_i(CQI)$, $thp_{f_{CQI},i}(q)$) such that the throughput indicator is represented by an estimated throughput ($thp_i(SNR)$) including retransmission gain at said quality indicator, CQI or SNR.

12. The first network node of claim 7, wherein the first network node is a user device or an access node.

* * * * *

UNITED STATES PATENT AND TRADEMARK OFFICE
CERTIFICATE OF CORRECTION

PATENT NO. : 9,054,834 B2  
APPLICATION NO. : 13/574203  
DATED : June 9, 2015  
INVENTOR(S) : Fröberg Olsson et al.

Page 1 of 1

It is certified that error appears in the above-identified patent and that said Letters Patent is hereby corrected as shown below:

IN THE SPECIFICATION

In Column 4, Lines 6-8, delete " $Thp_1 < Thp_2 < Thp_3 < Thp_4 < Thp_5 < Thp_6 < Thp_7 < Thp_8 < Thp_9 < < Thp_{10} < Thp_{11} < Thp_{12} < Thp_{13} < Thp_{14} < Thp_{15}$ " and insert -- $Thp_1 < Thp_2 < Thp_3 < Thp_4 < Thp_5 < Thp_6 < Thp_7 < Thp_8 < Thp_9 < Thp_{10} < Thp_{11} < Thp_{13} < Thp_{14} < Thp_{15}$ --, therefor.

In Column 13, Line 56, delete "TF$_i$;" and insert -- TF$_i$. --, therefor.

IN THE CLAIMS

In Column 20, Line 39, in Claim 9, delete "TF(f$_{CQI}$)." and insert -- TF(f$_{CQI}$)). --, therefor.

Signed and Sealed this  
Sixteenth Day of February, 2016

Michelle K. Lee  
*Director of the United States Patent and Trademark Office*